(12) United States Patent
Sundberg et al.

(10) Patent No.: US 10,117,227 B2
(45) Date of Patent: Oct. 30, 2018

(54) MANAGING OPERATION OF MULTIPLE RADIO ACCESS TECHNOLOGIES

(71) Applicant: TELEFONAKTIEBOLAGET LM ERICSSON (PUBL), Stockholm (SE)

(72) Inventors: Mårten Sundberg, Årsta (SE); Olof Liberg, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 6 days.

(21) Appl. No.: 15/319,451

(22) PCT Filed: Jun. 30, 2015

(86) PCT No.: PCT/SE2015/050764
§ 371 (c)(1),
(2) Date: Dec. 16, 2016

(87) PCT Pub. No.: WO2016/003360
PCT Pub. Date: Jan. 7, 2016

(65) Prior Publication Data
US 2017/0135071 A1    May 11, 2017

Related U.S. Application Data

(60) Provisional application No. 62/021,032, filed on Jul. 4, 2014.

(51) Int. Cl.
*H04W 72/04* (2009.01)
*H04W 4/70* (2018.01)
(Continued)

(52) U.S. Cl.
CPC ............ *H04W 72/04* (2013.01); *H04W 4/00* (2013.01); *H04W 4/70* (2018.02); *H04W 16/14* (2013.01); *H04W 4/06* (2013.01); *H04W 88/06* (2013.01)

(58) Field of Classification Search
None
See application file for complete search history.

(56) References Cited

U.S. PATENT DOCUMENTS

2011/0286408 A1    11/2011   Flore et al.
2013/0136098 A1    5/2013    Li et al.
(Continued)

FOREIGN PATENT DOCUMENTS

WO    2012050383 A2    4/2012
WO    2012109439 A1    8/2012
(Continued)

OTHER PUBLICATIONS

European Search Report dated Jul. 3, 2017, issued in European Patent Application No. 15815145.6, 4 pages.
(Continued)

*Primary Examiner* — Kodzovi Acolatse
(74) *Attorney, Agent, or Firm* — Sage Patent Group

(57) ABSTRACT

A method, performed by a wireless communication system (100), a method and node therein are provided for managing operation of multiple Radio Access Technologies, "RATS". A first type of wireless devices (120) is enabled to communicate wirelessly in the wireless communication system (100) according to a first RAT, via one or more base stations (110). In the first RAT, resource blocks for uplink and/or downlink communication are allocated according to a predetermined multiple access structure based on frequency division and/or time division. The wireless communication system (100) excludes (701) for allocation to the first type of wireless devices (120) one or more of said resource blocks of the first RAT. The wireless communication system (100) further allocates (702) said excluded one or more resource blocks of the first RAT for use by a second type of wireless
(Continued)

devices (121) and for wireless communication according to a second RAT, via said one or more base stations.

16 Claims, 6 Drawing Sheets

(51) Int. Cl.
  *H04W 4/00* (2018.01)
  *H04W 16/14* (2009.01)
  *H04W 4/06* (2009.01)
  *H04W 88/06* (2009.01)

(56) References Cited

U.S. PATENT DOCUMENTS

| | | | |
|---|---|---|---|
| 2013/0176995 | A1 | 7/2013 | Park et al. |
| 2013/0208664 | A1* | 8/2013 | Viswanathan ...... H04W 52/243 370/329 |
| 2013/0294319 | A1* | 11/2013 | Haapaniemi ........ H04W 72/121 370/312 |
| 2013/0308572 | A1 | 11/2013 | Sayana et al. |
| 2014/0098761 | A1 | 4/2014 | Lee et al. |
| 2014/0328225 | A1* | 11/2014 | Zhou ..................... H04W 16/14 370/280 |
| 2015/0146629 | A1* | 5/2015 | Ranta-aho ......... H04W 72/0453 370/329 |

FOREIGN PATENT DOCUMENTS

| | | | | |
|---|---|---|---|---|
| WO | WO 2013/059979 | * | 5/2013 | ............ H04W 72/12 |
| WO | 2013112983 A2 | | 8/2013 | |

OTHER PUBLICATIONS

Alcatel Lucent et al., "A Choice of Future m2m Access Technologies for Mobile Network Operators," In: Cellular IoT Whitepaper, dated Mar. 28, 2014, 16 pages.

Ericsson, "GSM optimization for Internet of Things," 3GPP TSG GERAN#62, Tdoc GP-140297, Valencia, Spain, May 26-30, 2014, 16 pages.

Huawei Technologies Co., Ltd. et al., "Discussion on MTC Evolution for Cellular IoT," 3GPP TSG GERAN #62, GP-140322, Valencia, Spain, May 26-30, 2014, 6 pages.

Huawei Technologies Co., Ltd. et. al., "Evaluations on Narrow-band M2M," 3GPP TSG GERAN #62, GP-140323, Valancia, Spain, May 26-30, 2014, 10 pages.

International Search Report and Written Opinion issued in corresponding International application No. PCT/SE2015/050764, dated Oct. 27, 2015, 16 pages.

3GPP TS 44.060 V13.3.1, "3rd Generation Partnership Project;Technical Specification Group Radio Access Network; General Packet Radio Service (GPRS); Mobile Station (MS)—Base Station System (BSS) interface; Radio Link Control / Medium Access Control (RLC/MAC) protocol (Release 13)" 3rd Generation Partnership Project, Sep. 2016, 745 pages.

* cited by examiner

MANAGING OPERATION OF MULTIPLE RADIO ACCESS TECHNOLOGIES

CROSS REFERENCE TO RELATED APPLICATION(S)

This application is a 35 U.S.C. § 371 National Phase Entry Application from PCT/SE2015/050764, filed Jun. 30, 2015, which claims priority to U.S. Application No. 62/021,032, filed Jul. 4, 2014. The above identified applications are incorporated by reference.

TECHNICAL FIELD

Embodiments herein relate to a wireless communication system, such as a telecommunications network, a method and node therein, and in particular to operation of multiple Radio Access Technologies (RATs) in the wireless communication system, where e.g. a first RAT is Global System for Mobile Communications (GSM).

BACKGROUND

Communication devices such as wireless devices are also known as e.g. User Equipments (UEs), mobile terminals, wireless terminals and mobile stations (MSs). Wireless devices are enabled to communicate wirelessly in a cellular communication network, wireless communication network or wireless communications system, sometimes also referred to as a cellular radio system or a cellular network. The communication may be performed, e.g., between two wireless devices, between a wireless device and a regular telephone and/or between a wireless device and a server via a Radio Access Network (RAN), and possibly one or more core networks, comprised within the cellular communication network.

Wireless devices may further be referred to as mobile telephones, cellular telephones, laptops, or tablet computer with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communication network covers a geographical area which is divided into cell areas, wherein each cell area being served by an access node such as a base station (BS), e.g., a Radio Base Station (RBS), which sometimes may be referred to as e.g. "evolved Node B", "eNB", "eNodeB", "NodeB", "B node", "node B" or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile). In 3rd Generation Partnership Project (3GPP) Long Term Evolution (LTE), base stations, which may be referred to as eNodeBs, eNBs or even NBs, may be directly connected to other base stations and may be directly connected to one or more core networks.

The 3GPP LTE radio access standard has been written in order to support high bitrates and low latency both for uplink and downlink traffic. All data transmission is in LTE are controlled by the base stations.

UMTS is a third generation mobile communication system, which may be referred to as 3G, and which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression Downlink (DL) may be used for the transmission path, or send direction, from a base station to a wireless device. The expression Uplink (UL) may be used for the transmission path, or send direction, in the opposite direction, i.e. from a wireless device to a base station.

Machine type communication (MTC) has in recent years shown to be a growing market segment for cellular technologies, especially for GSM and Enhanced Data Rates for GSM (GSM/EDGE) with its global coverage, ubiquitous connectivity and price competitive devices.

With more and more diverse MTC applications, increasingly diverse MTC requirements arise. Among these there is a low-end market segment characterized by all, or a sub-set, of the following requirements compared with the current GSM technology:

Extended coverage
Long battery life
Low device complexity
Large number of connected devices At the same time, many of the applications in this segment have properties such as small, uplink centric and infrequent transmissions, and relaxed requirements on data rates, latency and mobility, which can be exploited to meet the above requirements.

A proposal for the development of a new system to cater for the mentioned requirements has been presented as an "option 2" in a white paper "A Choice of Future m2m Access Technologies for Mobile Network Operators", dated 2014 Mar. 28, with contributors from Alcatel Lucent, Sony, Ericsson, TU Dresden, Huawei, u-blox, Neul, Verizon Wireless, NSN and Vodafone. The proposed system is especially focused on the UL access where it provides both extended coverage, and is prepared to cater for a large number of connected devices, and utilizes the fact that devices operating in the new system have relaxed requirements on data rates and latency. Fulfilling these two requirements is realized by using a very narrow carrier bandwidth as compared to GSM. However, this would require a completely new spectrum that is not compatible with any existing technologies. Resources between other systems operating in the same frequency band, and the new system, are segregated. Furthermore, since the system utilizes a narrow DL channel bandwidth compared to GSM, the coverage will effectively be reduced.

SUMMARY

It is an object to alleviate or a least reduce some or all of the above mentioned problems and/or for example meet some or all of the above mentioned requirements. A more specific object is to provide improvements with regard to handling of MTC in a wireless communication system.

According to a first aspect of embodiments herein, the object is achieved by a method, performed by a wireless communication system, for managing operation of multiple Radio Access Technologies (RATs). A first type of wireless devices is enabled to communicate wirelessly in the wireless communication system according to a first RAT, via one or more base stations. In the first RAT, resource blocks for uplink and/or downlink communication are allocated according to a predetermined multiple access structure based on frequency division and/or time division. The wireless communication system excludes for allocation to the first type of wireless devices one or more of said resource blocks of the first RAT. Further, the wireless communication system allocates said excluded one or more resource blocks of the first RAT for use by a second type of wireless devices and for wireless communication according to a second RAT, via said one or more base stations.

According to a second aspect of embodiments herein, the object is achieved by a computer program comprising instructions that when executed by a processing circuit causes a node comprised in the wireless communication system to perform the method according to the first aspect.

According to a third aspect of embodiments herein, the object is achieved by a data carrier comprising the computer program according to the second aspect.

According to a fourth aspect of embodiments herein, the object is achieved by a node, comprised in a wireless communication system, for managing operation of multiple RATs. A first type of wireless devices is enabled to communicate wirelessly in the wireless communication system according to a first RAT, via one or more base stations. In the first RAT, resource blocks for uplink and/or downlink communication are allocated according to a predetermined multiple access structure based on frequency division and/or time division. The node is configured to exclude for allocation to the first type of wireless devices, one or more of said resource blocks of the first RAT. The node is further configured to allocate said excluded one or more resource blocks of the first RAT for use by a second type of wireless devices and for wireless communication according to a second RAT, via said one or more base stations.

As should be appreciated, the embodiments herein enable simultaneous operation of multiple RATs in a shared frequency spectrum in the uplink and/or downlink. The second RAT, and possibly one or more additional RATs, may operate within and utilizing a framework already in place for the first RAT, e.g. in an already deployed wireless communication system that, as should be realized, typically will need comparatively small adjustments to implement embodiments herein.

The method is advantageous implemented with GSM as the first RAT and e.g. in existing GSM based wireless communication systems. The method may advantageously be implemented particularly in the uplink with the second RAT being a RAT specially adapted for Machine Type of Communication (MTC), such as a RAT having more carriers, but of narrower bandwidth, than available in GSM. In this way advantages discussed in the Background regarding "option 2" may be used but without many drawbacks also discussed in the Background. In other words, embodiments herein provide improvements with regard to handling of MTC in a wireless communication system.

BRIEF DESCRIPTION OF THE DRAWINGS

Examples of embodiments herein are described in more detail with reference to the appended schematic drawings, which are briefly described in the following.

DETAILED DESCRIPTION

Figure 1:
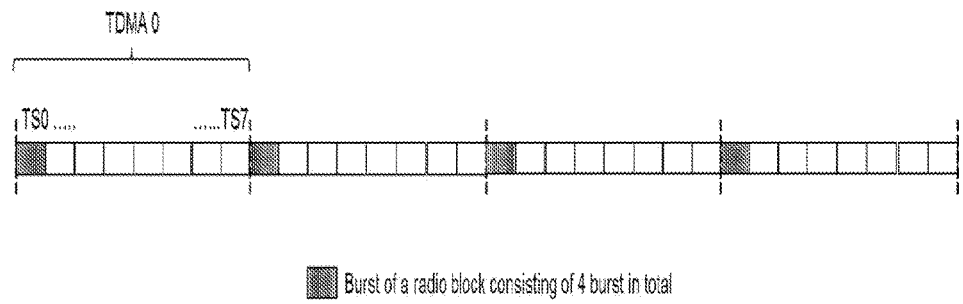
FIG. 1 schematically illustrates the Time Division Multiple Access (TDMA) frame structure of GSM.

Throughout the following description similar reference numerals have been used to denote similar elements, units, modules, circuits, nodes, parts, items or features, when applicable.

As part of the development towards embodiments herein, the situation and problems indicated above will be further discussed.

Figure 2:
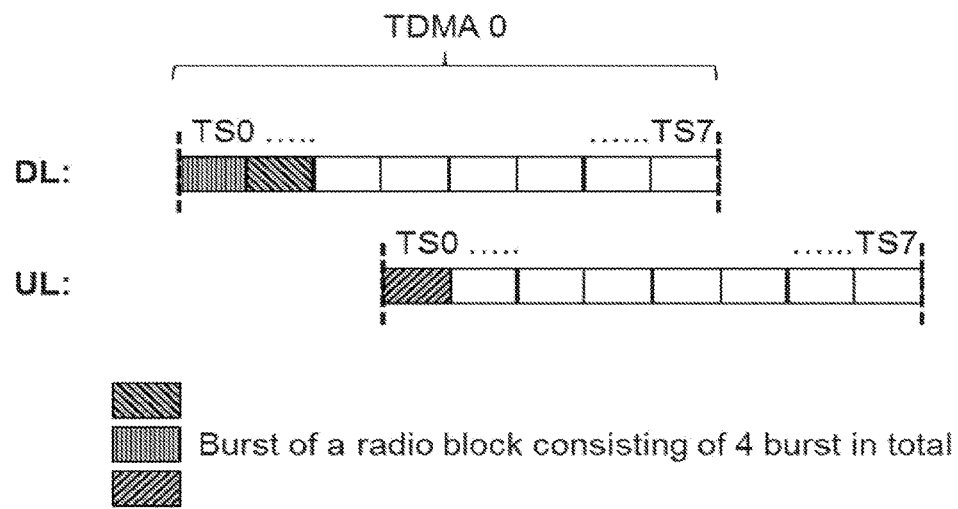
FIG. 2 schematically illustrates the principle of time shift between downlink (DL) and uplink (UL) in GSM.
Figure 3:
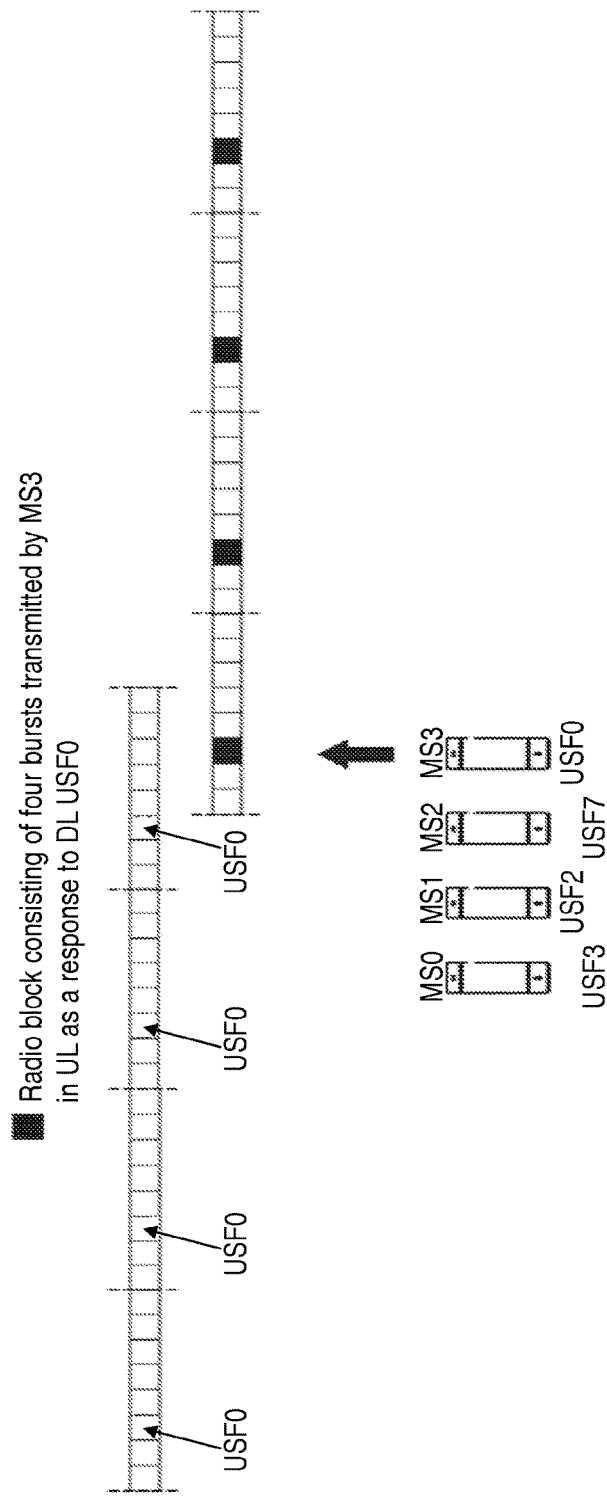
FIG. 3 schematically illustrates the principle of Uplink State Flag (USF) usage in GSM.

First, the principle of today's GSM time structure is shown for reference in FIGS. 1-3.

FIG. 1 schematically illustrates the Time Division Multiple Access (TDMA) frame structure of GSM where each TDMA frame is divided into eight Time Slots (TS).

FIG. 2 schematically illustrates the principle of time shift between DL and UL in GSM as well as the transmission of two bursts on TS0 and TS1 in the DL and the transmission of one burst on TS0 on the UL. The UL is always shifted with three TS compared to the DL frame structure. This allows the MS, i.e. a wireless device, to react on an Uplink State Flag (USF) sent on the DL in the next UL radio block period.

FIG. 3 schematically illustrates the principle of the USF usage and how UL resources are scheduled on the DL by the use of a USF transmitted over the 4 bursts of a radio block, received by each MS assigned UL resources on the TS where the USF is transmitted (in this case MS0, MS1, MS2, MS3). The MS will respond in the following radio block period (in this case MS3 responds since USF 0 is sent on the DL which is only assigned MS3).

For allocating UL resources the basic principle is that is followed is to send USFs in the DL in the radio block period prior to the UL transmission to schedule the corresponding UL resources as the DL USF has been sent on. For example, transmitting a USF on TS0 in radio block period N will schedule a radio block on the UL in radio block period N+1.

A narrow carrier bandwidth compared to e.g. GSM as for the solution according to "option 2" as discussed in the Background implies on one hand that only a low data rate can be realized, but on the other hand that multiple devices can simultaneously share the same spectrum by using Frequency Division Multiple Access (FDMA).

Since a significant portion of the MTC devices are assumed to be stationary and situated in poor coverage locations, for example a gas meter in a basement, the transmitted power is of importance, and allowing multiple users in the same narrow spectrum, each transmitting with a high output power ensures that all can get improved coverage. This should be compared to a more wideband technology, such as GSM, where the same spectrum would be used by a smaller number of users, each using the same transmit power as the narrow bandwidth users. Note that, as used herein, "user" may be considered to refer to a wireless device operative in a wireless communication system.

Figure 4:
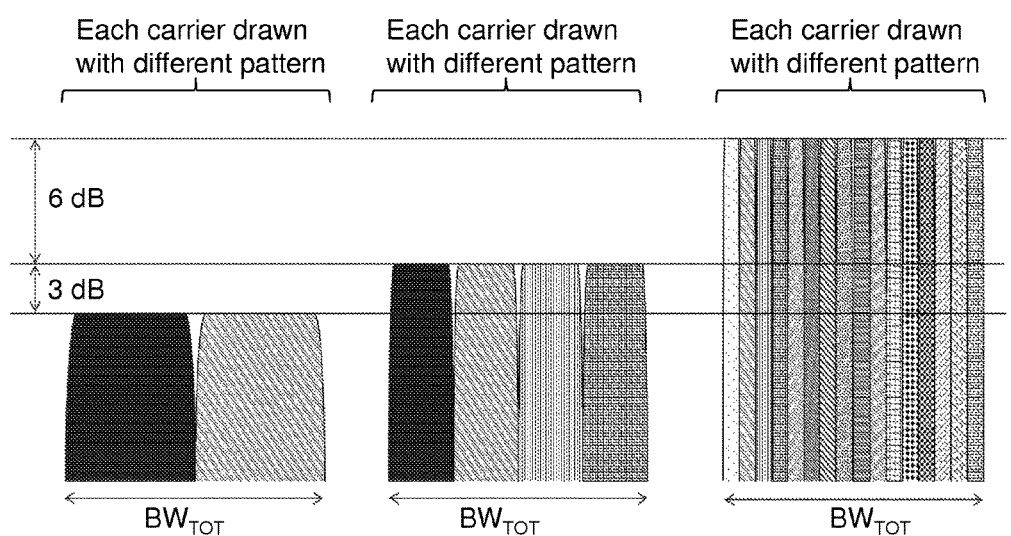
FIG. 4 schematically illustrates situations with carriers transmitting with the same transmit power.

FIG. 4 schematically illustrates a situation with carriers transmitting with the same transmit power. More particularly, FIG. 4 shows three examples of different carrier bandwidths and number of carriers used by different users, shown with different patterns. The difference is the spectrum bandwidth and the Power Spectral Density (PSD) of each carrier. With all other things equal, using the same transmit power, but different bandwidths of the signals transmitted the coverage achieved by each carrier can be considered roughly the same.

Hence in the three examples in FIG. 4, the leftmost two carriers can in effect serve ⅛ of users in the same coverage, as the set of 16 carriers to the right. Both examples are taking up the same spectrum but since each device can transmit with the same output power for each carrier, using a narrow carrier bandwidth effectively increases the number of simultaneously served users with a factor of 8 on the UL.

FIG. 4 thus illustrates the case of multiple transmitters in a system with each transmitter assigned its own carrier frequency. This is typically the case of the UL in cellular systems. There is however a different situation on the DL where a single base station is serving the different users located in the same cell. I.e. the single transmitting entity is limited by its output power, and hence this effectively reduces the output power per carrier the more carriers are used, which consequently reduces the coverage for each user the narrower bandwidth that is used.

Figure 5:
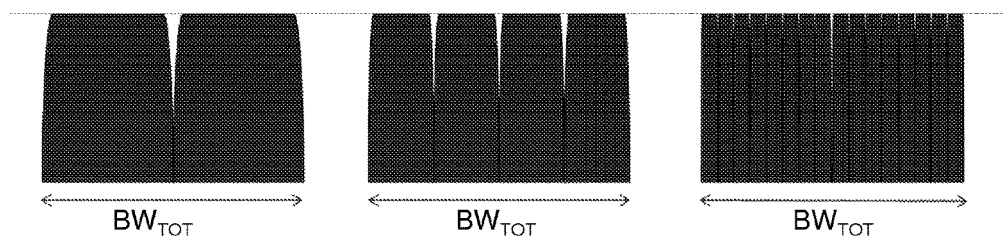
FIG. 5 schematically shows three examples of different carrier bandwidths and a number of carriers transmitted by the same transmitter.

FIG. 5 schematically shows three examples of different carrier bandwidths and a number of carriers transmitted by the same transmitter, illustrated by same pattern.

In this context, a simplistic concept of coverage can introduced to ease the understanding of FIG. 4 and FIG. 5. A device can be said to be limited in coverage by its transmission power which can be estimated as the factor of the carrier bandwidth (BW) and PSD of the carrier (BWcarrier*PSDcarrier). This does not reveal all about the coverage limit of that specific carrier, and for example a longer transmission time would help to accumulate the energy per transmitted bit, to effectively increase coverage by utilizing the time domain. This however has a negative impact on the transmission time needed and hence will utilize more resources, having negative impact on overall system capacity.

Hence, while such system mentioned in the Background as "option 2" may be improved, it clearly also has advantages. If instead GSM would evolve to cater for the requirements mentioned in the Background while keeping channel BW intact, the system capacity achieved on the UL will be limited compared with such system according to "option 2". With a channel bandwidth of 5 kHz, i.e. a similar situation as in FIG. 1 but with around 40 channels for the solution according to "option 2" compared to 1 channel in GSM, the system according to "option 2" would effectively increase system capacity with a factor of 40 in extreme coverage conditions.

In conclusion, in contrast to known solutions, it would be desirable with a new solution that:

Utilizes the increased UL system capacity offered by a narrowband system.

Allows multiplexing of the new narrowband channels onto existing GSM system deployments in the same frequency band.

Avoids limitation in DL coverage by the use of narrowband carriers.

Embodiments herein, as presented below, relate to such solution.

Figure 6:
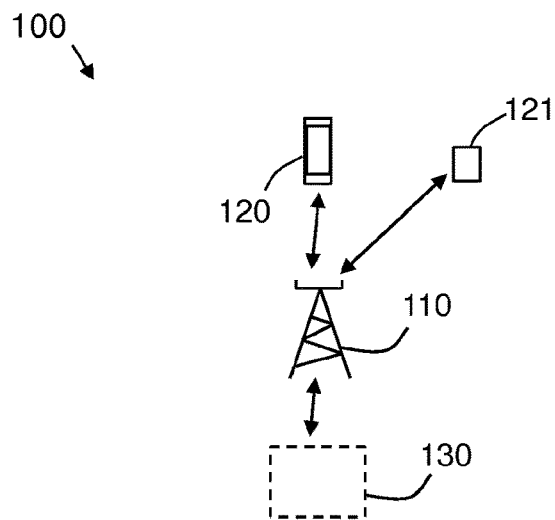
FIG. 6 is a schematic block diagram schematically depicting an example of a wireless communication system 100 relevant for embodiments herein.

FIG. 6 is a schematic block diagram schematically depicting an example of a wireless communication system 100 relevant for embodiments herein. The wireless communication network 100 is typically a telecommunication system, such as a cellular communication network that e.g. may be based on GSM, LTE and/or UMTS. Although not shown here, the wireless communication network 100 typically comprises a RAN and a core network.

A base station 110, e.g. BTS in GSM, which is an example of a node comprised in the RAN, i.e. a radio network node, is shown comprised in the wireless communication system 100. The base station 110 may be controlled, or managed, by a controlling, or managing, node 130, e.g. BSC in GSM, which also is an example of a radio network node. The controlling node 104 may control or manage several base stations of the wireless communication system 100 although not illustrated here. The base station 110 and/or the controlling node 130, may serve and/or control and/or manage one or more wireless devices, e.g. UEs, such as a first wireless devices 120 and a second wireless device 121 shown in the figure, which are supported by the wireless communication system 100.

The first wireless device 120 is an example of a first type of wireless devices that is enabled to communicate in the wireless communication system 100. The first type of wireless devices may comprise conventional cellular, mobile, phones, e.g. smart phones. The enabled communication is via the base station 110, in the uplink and downlink, and according to a first RAT, e.g. GSM.

The second wireless device 121 is an example of a second type of wireless devices that are enabled to communicate in the wireless communication system 100. The first type of wireless devices may be a device specifically for MTC. The enabled communication is via the base station 110, in the uplink and/or downlink, and according to a second RAT that is different from the first RAT, and e.g. is adapted to specifically handle the second type of devices, e.g. MTC devices.

Note that the wireless device 120 may additionally support the second RAT in the uplink and/the uplink and/or that the second wireless device 121 may additionally support the first RAT in the uplink and/or downlink.

In some embodiments, further discussed below, the wireless device 121 is enabled to communicate in the uplink according to the second RAT and in the downlink according to the first RAT.

Attention is drawn to that FIG. 6 is only schematic and for exemplifying purpose and that not everything shown in the figure is required for all embodiments herein, as will be evident to the skilled person based on what is disclosed herein. Also, a wireless communication system that in reality corresponds to the wireless communication system 100 typically comprises several further network nodes, base stations, cells etc., as realized by the skilled person, but which are not shown herein for the sake of simplifying.

Figure 7:
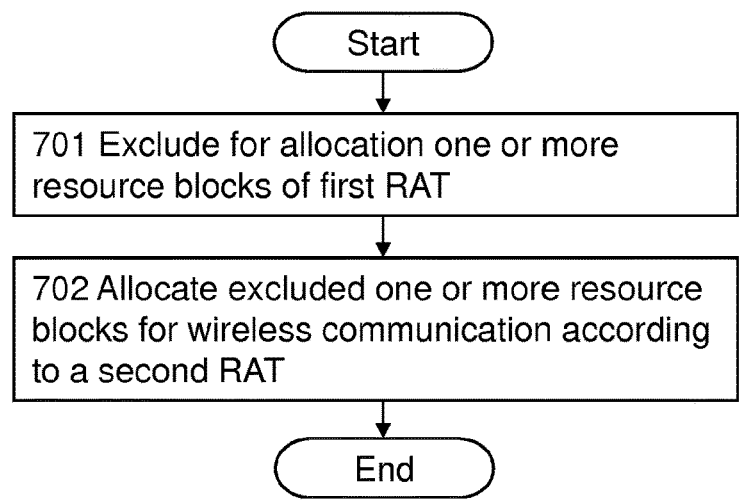
FIG. 7 is a flow chart schematically illustrating embodiments of a method performed by a wireless communication network, e.g. by a node comprised therein.

FIG. 7 is a flow chart schematically illustrating embodiments of a method, performed by a wireless communication system, e.g. the wireless communication system 100, for managing operation of multiple Radio Access Technologies (RATs). A first type of wireless devices, such as said first type discussed above for the first wireless device 120, are enabled to communicate wirelessly in the wireless communication system 100 according to a first RAT, such as the first RAT discussed above, via one or more base stations, e.g. the base station 110. The enabled communication according to the first RAT is typically in both the uplink and downlink. The first RAT may e.g. be GSM. In the first RAT, resource blocks for uplink and/or downlink communication are allocated according to a predetermined multiple access structure based on frequency division and/or time division, such as a predetermined FDMA and/or TDMA structure.

The method is typically performed by one or more nodes in the wireless communication system 100, e.g., one or more network nodes, typically radio network nodes, e.g. the base station 110 and/or the controlling node 130. For example, when the wireless communication system is based on GSM and the first RAT is GSM, the method may, at least partly, be carried out by the controlling node 130 being a BSC.

The method comprises the following actions, which actions may be taken in any suitable order and/or be carried out fully or partly overlapping in time when this is possible and suitable.

Action 701

The wireless communication system 100 excludes for allocation to the first type of wireless devices, one or more of said resource blocks of the first RAT.

Action 702

The wireless communication system 100 allocates said excluded one or more resource blocks of the first RAT for use by a second type of wireless devices and for wireless communication according to a second RAT, via said one or more base stations, e.g. the base station 110. The second type of wireless devices may be the second type discussed above for the second wireless device 121.

The wireless communication according to the second RAT may be in the uplink and/or downlink.

In some embodiments, the wireless communication of the second type of wireless devices is according to the second RAT in the uplink and according to the first RAT in the downlink. Hence, the wireless communication of the second type of wireless device may be according to the second RAT only in the uplink and communication in the downlink may be according to the first RAT, i.e. communication in the downlink may be according to the same RAT as for the first type of wireless devices.

In some embodiments, the second RAT may define its own resource blocks within the time and/or frequency space corresponding to the excluded one or more resource blocks of the first RAT.

Said one or more resource blocks of the first RAT may be multiple resource blocks that are continuous in frequency and/or time, thereby forming a continuous block. Said continuous block may be continuous in time and/or frequency over a whole channel of the first RAT. Further, the second RAT may use subblocks of the continuous block as resource blocks of the second RAT and may use a frequency division factor and/or time division factor that is different than of the first RAT. Thereby the second RAT is enabled to define a resource block of the second RAT in relation to dimensions of a resource block of the first RAT. In other words, the second RAT may use a frequency division factor and/or time division factor that is different, e.g. smaller, than of the first RAT, and may thereby define the subblocks in relation to the dimensions of a resource block of the first RAT. The factors may be chosen so that a channel of the first RAT is split into multiple channels of the second RAT.

One or more control channels of the first RAT may be shared with the second RAT. Or in other words, the second RAT may use one or more control channels of the first RAT The second RAT may advantageously use an even multiple of a symbol rate of the first RAT.

As already mentioned, the first RAT may be GSM. Said second RAT may then advantageously be a RAT having more carriers, but of more narrow bandwidth, than in GSM. The exclusion under Action 701 may be accomplished by using Uplink State Flag (USF) values assigned to the second type of wireless devices for communication according to the second RAT.

Note that the exclusion in Action 701 may be accomplished indirectly by exclusive allocation.

Said allocation in Action 702 for use by the second type of wireless devices, e.g. the second wireless device 121, means that the excluded one or more resource blocks of the first RAT, within the explicit and/or implicit restrictions associated with and/or set by said resource blocks according to the first RAT, e.g. how they are bound in frequency and time, may be used in accordance with, e.g. defined by, the second RAT independent from the first RAT. For example may the second RAT define its own resource blocks within the time and/or frequency space corresponding to, such as defined by, the excluded one or more resource blocks of the first RAT.

When the first RAT is GSM:

The resource blocks may be so called radio blocks.

The exclusion may be accomplished by using USF values exclusively allocated for and/or assigned to the second type of wireless devices for communication according to the second RAT. These USF values may signal to wireless devices of the first type, e.g. the wireless device 120, which radio blocks in the uplink they shall not use and/or may signal to the wireless devices of the second type, e.g. the second wireless device 121, which radio blocks, or rather corresponding space in frequency and time, they may use according to the second RAT.

As should be appreciated, the embodiments herein enable simultaneous operation of multiple RATs in a shared frequency spectrum in the uplink and/or downlink. The second RAT, and possibly one or more additional RATs, may operate within and utilizing a framework already in place for the first RAT, e.g. in an already deployed wireless communication system that, as should be realized, typically will need comparatively small adjustments to implement embodiments herein.

The method described above and as is described in further detail below, is advantageous implemented with GSM as the first RAT and e.g. in existing GSM based wireless communication systems. The method may advantageously be implemented particularly in the uplink with the second RAT being a RAT specially adapted for MTC, such as a RAT having the characteristics discussed in the Background and e.g. discussed with reference to the solution according to "option 2", i.e. one having more carriers, but of more narrow bandwidth, than available in GSM.

It should also be appreciated that the method offers great scalability for deployment of the second RAT and that the lifetime of the wireless communication system may be extended. For example, the number and traffic generated by MTC wireless devices may increase while GSM traffic from conventional devices may decrease and transfer to e.g. UMTS and LTE. Thanks to embodiments herein, the wireless communication system may continue to be cost efficiently used for a longer period, handling an increasing amount of MTC traffic.

Advantages of embodiments herein for example involve:
They enable existing wireless communication system deployments, in particular such based on GSM, to evolve and support more extreme coverage scenarios while simultaneously catering for a massive amount of devices deployed in these scenarios.

Embodiments herein facilitate and enable simple resource pooling scheme between the first RAT and the second RAT.

Further, they facilitate and enable use of common channels, e.g. where the second RAT may use a channel of the first RAT, such as one or more of the following channels in common: broadcast channel, frequency correction channel, synchronization channel and control channel, and e.g. a common control channel handling for both systems. Alternatively, the second RAT may use separate channels of its own but that follow a physical layer design of the first RAT, e.g. GSM.

Embodiments herein, such as discussed above, will in the following be exemplified in some further detail for the case when the first RAT is GSM. As used below, "user" refers to a wireless device operative in the wireless communication system 100, e.g. the first wireless device 120 or the second wireless device 121.

The second RAT may be considered and herein be referred to as being overlaid and/or an overlaid system. Similarly, and in relation to the second RAT, the first RAT may be considered and herein be referred to as being underlaid and/or an underlaid system.

In a first embodiment, the USFs sent over one or more DL Time Slots (TSs) contains USF values not assigned to users in the GSM system, i.e. of the first RAT. This may either be one of the seven USF values possible to allocate users for UL data transmission, or the reserved USF value, in total resulting in 8 values, carried by 3 USF bits. In effect, this will ensure that no user from the GSM system is transmitting during the TS duration. This may also be expanded to apply to multiple radio block periods, or Transmit Time Intervals (TTIs) to effectively allocate a continuous block in time over the whole GSM channel.

In a second embodiment, the continuous block in time over the GSM channel, i.e. of the first RAT, is used by users using an alternative UL access technology, i.e. of the second RAT. The only requirement for backwards compatible operation with GSM may be that the time duration of the allocated continuous block in time is not exceeded and that the bandwidth of the alternative UL access technology, i.e. second RAT, does not exceed that of GSM.

In a third embodiment the continuous block in time and frequency provided by the reserved USF(s) of the first RAT, i.e. GSM, is used to allow for an overlaid FDMA structure of the second RAT within the duration of a single GSM channel. Overlaid in this sense refers to a FDMA structure using a smaller frequency division factor than the one used in GSM, with the number of multiple access channels bounded by the single GSM channel, or alternatively multiple GSM channels if UL resources are allocated on consecutive GSM channels.

In a fourth embodiment the resources in the FMDA structure of the alternative access technology, i.e. the second RAT, is scheduled in the UL by the use of the USF transmitted in the DL. Overlaid FDMA structure, e.g. channels, in the UL can be considered "orthogonal" in the sense that simultaneous transmission and hence the users in each UL channel can respond to the same or different USF values. Reusing the same USF value to schedule multiple users will limit the risk for USF identifier depletion.

In a fifth embodiment the resources in the FMDA structure of the alternative access technology, i.e. of the second RAT, is scheduled in the UL by the use of a fixed allocation that e.g. may be as disclosed in said white paper "A Choice of Future m2m Access Technologies for Mobile Network Operators" mentioned in the Background. The use of a fixed allocation Temporary Block Flow (TBF) in the UL may eliminate the risk for USF identifier depletion.

In a sixth embodiment an overlaid TDMA structure, i.e. of the second RAT, is used over the GSM TDMA structure of the first RAT to achieve orthogonal channels in time that can be used for multiple access of multiple users. As for the overlaid FDMA structure a smaller time division factor than the one used in one GSM channel and frame need to be used. Alternatively, UL resources can be allocated on consecutive TSs and/or TTIs, in which case the time duration of the consecutive TSs and/or TTIs sets a boundary for the time division achievable.

Since a DL USF, or a fixed allocated set up, will schedule a radio block period in the UL, as per in legacy, i.e. as in conventional, GSM operation, both the overlaid FDMA structure and the overlaid TDMA structure may need to follow the boundaries in time and frequency provided by the FDMA and TDMA structure in GSM.

Figure 8A:
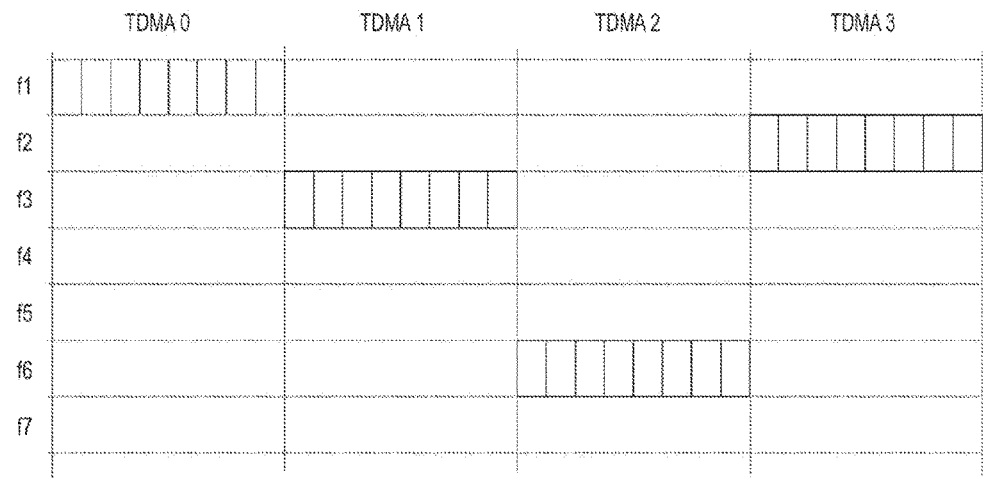
FIGS. 8*a-b* schematically shows an example of a GSM channel occupancy with frequency hopping between the TDMA frames and an overlaid Frequency Division Multiple Access (FDMA) and TDMA structure.
Figure 8B:
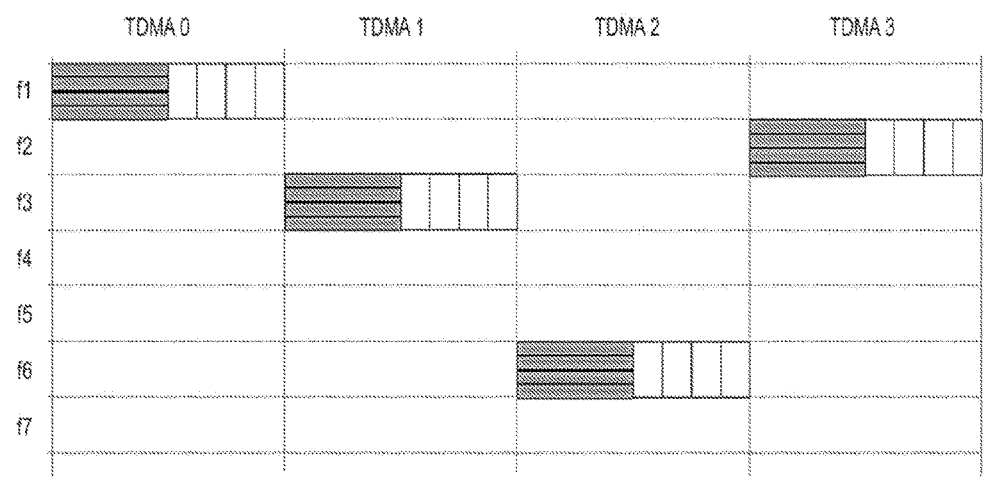

FIGS. 8*a*-*b* schematically shows an example of a GSM channel occupancy with frequency hopping between the TDMA frames, see FIG. 8*a*, and an overlaid FDMA and TDMA structure, see FIG. 8*b*, as discussed above and that may be used in implementation of embodiments herein. In the example the overlaid FDMA structure, e.g. of the second RAT, is of a factor of 4, i.e. a single GSM channel is divided into four separate frequency channels, and the overlaid TDMA structure, e.g. of the second RAT, is a factor of ¼, i.e. the eight TS of the GSM TDMA frame, such as of the first RAT, is instead divided into 2 TS of the overlaid FDMA structure, such as of the second RAT. In this example, the first four GSM TS (TS0-TS4), e.g. of the first RAT, are hence covered by the first overlaid TS (TS0overlaid), e.g. of the second RAT, while the remaining four TS are scheduled for regular users, such as of the first RAT, e.g. for the first wireless device 121, and thus follow a regular GSM TS pattern.

In a seventh embodiment common and dedicated control channels in the UL are shared between users of the different systems, i.e. of the first RAT being GSM and the second RAT. This could for example apply to the Random Access Channel (RACH) in the UL where both GSM system, i.e. first RAT, users such as the first wireless device 120, and the new system, i.e. second RAT, users such as the second wireless device 121, would share the same radio resources in a GSM 51-multiframe structure but would use different access techniques, used by the first RAT and second RAT respectively, thus depending on the system used for access.

The principles of embodiments herein need not only apply to having a common DL based on GSM, and different UL system design. For example, it may be beneficial to go beyond shared channels in the UL and also share certain physical design aspects.

In an eight embodiment, a physical layer design of the new system, i.e. of the second RAT, would in the case of common and dedicated control channels adhere to GSM design principles. In a specific example of the RACH, a GSM Access burst may be used for system access by both systems, i.e. of both the first RAT and the second RAT.

Using a smaller frequency divisor for an overlaid FDMA structure, e.g. for the second RAT, and/or time divisor for an overlaid TDMA structure, e.g. for the second RAT, as described above, will typically imply that less information is transmitted during the same time unit as the underlying system, i.e. of the first RAT. Hence, when the radio quality allows for a larger bandwidth to be used, this is preferable from a wireless device perspective to minimize the on time, i.e. active transmission and/or reception, of the wireless device, but also for the system, i.e. the wireless communication system 100, to utilize the spectrum efficiently.

In an ninth embodiment the network, i.e. the wireless communication system 100, will adaptively change the system operation mode, e.g. according to the first Rat or the second RAT, depending on a set of metrics, such as experienced radio quality and signal strength. This kind adaptation for wireless devices between for example legacy, such as conventional, GSM transmission, according to the first RAT and transmission of a new UL narrowband access technology, according to the second RAT, may depend on for example coverage class and resource allocation. E.g. if no extended coverage is needed a wireless device may be considered to operate as a legacy, e.g. conventional, GSM device according to the first RAT. Allowing this kind of adaptation may ensure a shorter on time and may hence improve battery time and system resource utilization.

To allow for an efficient implementation of both wireless devices and network equipment supporting multi system operation, such as described above, it is of benefit to utilize as many common system parameters as possible. One parameter of great importance, due to its impact to baseband and radio implementation and the interface in-between the two, is the sample rate of the system, or more specifically the symbol duration.

In a tenth embodiment, the sample rate of the overlaid system(s), such as of the second RAT, is defined at a symbol rate which is an even multiple of the symbol rate used in the underlying system, such as of the first RAT. For example, a symbol rate of a quarter of the GSM symbol rate of e.g. the first RAT can be used to create four overlaid channels of e.g. the second RAT, bounded by one GSM channel frequency.

Although the overlaid system, such as of the second RAT, may be re-designed for parts that have no common design ground with the underlying system, such as of the first RAT and e.g. conventional GSM, a protocol level functionality from the underlying system, e.g. of the first RAT, can still be re-used to minimize system impact and also allow for a smooth operation when switching devices between the systems it is operating in. For example, for conventional GSM as the first RAT, the Radio Link Control (RLC) protocol may be fully re-used for the second RAT, but also the use of more Radio Resource Management (RRM) related functionality such as identifier space may be common to, i.e. shared between, both/all systems, such as of both the first RAT and the second RAT.

In conclusion, embodiments herein relate to, e.g. enable, the following:

A narrowband UL access technology, e.g. according to the second RAT, may be multiplexed in existing GSM deployments, e.g. according to the first RAT.

Full multiplexing of resources between the systems, i.e. of the first RAT and the second RAT, may be achieved by dynamic or static UL resource allocation as per legacy, i.e. conventional, GSM control channel handling, by e.g. reserving UL resources for the alternative UL access technology, such as of the second RAT.

Common control channels, broadcast channels, frequency correction and synchronization channels may be either shared between the two systems, i.e. of the first RAT and the second RAT, e.g. by using existing Frequency correction Channel (FCCH), Synchronization Channel (SCH), Broadcast Control Channel (BCCH) and/or Common Control Channel (CCCH), such as in conventional GSM, or alternatively, mapped onto one and the same GSM carrier resources in the DL. In other words, new logical channels may be used but the same physical layer design as in GSM on the DL is maintained.

The alternative access technology, i.e. the second RAT, may be bounded by the same TDMA and/or FDMA structure as the overlaying GSM system, i.e. according to the first RAT, to ensure inter-system-interference is avoided, and to ensure that that resources allocated to the new system, i.e. according to the second RAT, may be fully utilized, for example by not leaving half of a burst duration in GSM empty.

Adaptation of wireless devices between legacy GSM transmission, e.g. according to the first RAT, and transmission of the new UL access technology, i.e. of the second RAT, may be allowed depending on for example coverage class and resource allocation. If no extended coverage is needed a wireless device may be considered to operate as a legacy, e.g. a conventional, GSM device, such as according of the first RAT. This may ensure a shorter on time and hence improve e.g. the battery time of the wireless device.

Easy implementation of the new access technology, i.e. the second RAT, in existing GSM modules, i.e. modules of the first Rat, may be accomplished by having the GSM symbol rate represent a multiple of the symbol rate used by the second RAT, e.g. such that $R_{GSM} = N^* R_{NEW\ ACCESS\ TECHNOLOGY}$, where N may be an integer, $R_{GSM}$ is the symbol rate of GSM, i.e. the first RAT, and $R_{NEW\ ACCESS\ TECHNOLOGY}$ is the symbol rate of the second RAT.

Embodiments herein have been exemplified and discussed mainly the context of GSM, and Enhanced Data Rates for GSM (EDGE), radio access technology, as should have been recognized. It should however be noted that the principles described herein can be applied more generally as recognized by the skilled person, where two RATs, e.g. the first RAT and the second RAT, may operate on the same radio resources of the first RAT with one of more common design baselines. The detailed examples and details of the embodiments provided herein may be considered to relate to such common design baseline with e.g. the DL design from GSM but a separate UL design for the second RAT, which may be narrower banded. It should further be understood that more than two RATs of course may operate in the same spectrum following the general principles outlined herein by simple extension of the principles.

Figure 9:
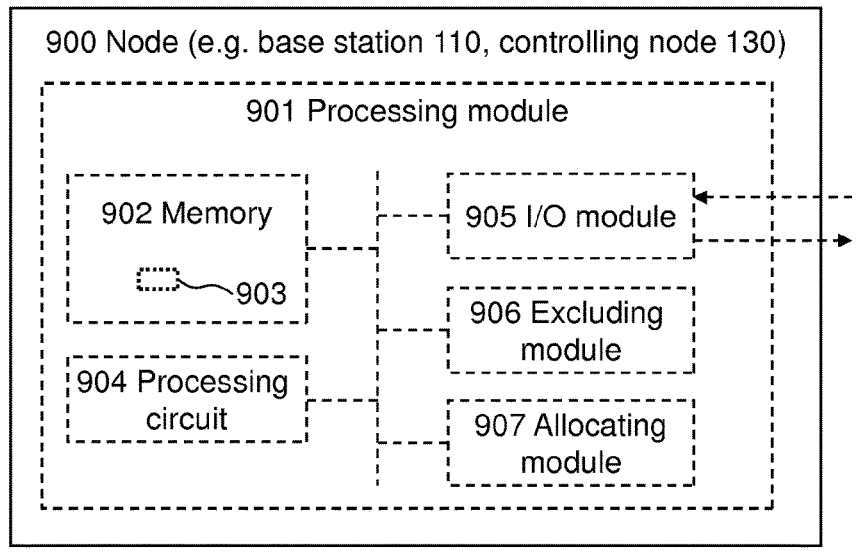
FIG. 9 is a schematic block diagram for illustrating embodiments of the wireless communication system, in particular for illustrating how the node comprised therein may be configured to perform the method.

FIG. 9 is a schematic block diagram for illustrating embodiments of the wireless communication system 100, in particular how a node 900 thereof may be configured to perform the method and/or one or more actions described herein, in particular the method and actions discussed above in relation to FIG. 7. The node 900 may correspond to the base station 110 and/or the controlling node 130. Hence, the node 900 may comprise:

A processing module 901, such as a means, one or more hardware modules, including e.g. one or more processors, and/or one or more software modules for performing said methods and/or actions.

A memory 902 that may comprise, such as contain or store, a computer program 903. The computer program comprises 'instructions' or 'code' directly or indirectly executable by the node 900 so that it performs the said methods and/or actions. The memory 902 may comprise one or more memory units and may be further be arranged to store data, such as configurations and/or applications involved in or for performing functions and actions of embodiments herein.

A processing circuit 904 as an exemplifying hardware module and may comprise or correspond to one or more processors. In some embodiments, the processing module 901 may comprise, e.g. 'is embodied in the form of' or 'realized by' the processing circuit 904. In these embodiments, the memory 902 may comprise the computer program 903 executable by the processing circuit 904, whereby the node 900 is operative, or configured, to perform said method and/or actions.

An Input/Output (I/O) module 905, configured to be involved in, e.g. by performing, any communication to and/or from other units and/or nodes, such as sending and/or receiving information to and/or from other external nodes or devices. The I/O module 905 may be exemplified by an obtaining, e.g. receiving, module and/or a sending module, when applicable.

The node 900 may also comprise other exemplifying hardware and/or software module(s) as may have been described elsewhere in the present disclosure, which module(s) may be fully or partly implemented by the processing circuit 904.

Hence, according to the various embodiments described above, the node 900 and/or the processing module 901 and/or the excluding module 906 may be operative, or configured, to exclude for allocation to the first type of wireless devices said one or more of said resource blocks of the first RAT.

Further, according to the various embodiments described above, the node 900 and/or the processing module 901 and/or the allocating module 907 may be operative, or configured, to allocate said excluded one or more resource blocks of the first RAT for use by said second type of wireless devices and for wireless communication according to said second RAT, via said one or more base stations.

Figure 10A:
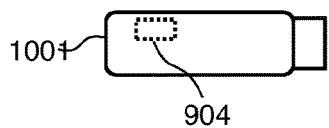
FIGS. 10*a-c* are schematic drawings illustrating embodiments relating to computer program products and computer programs to cause the node to perform method actions.
Figure 10B:
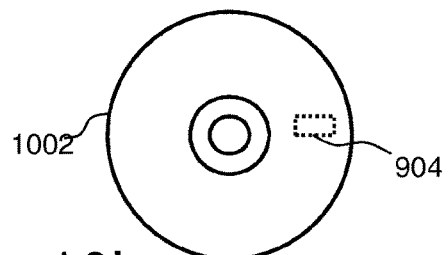
Figure 10C:
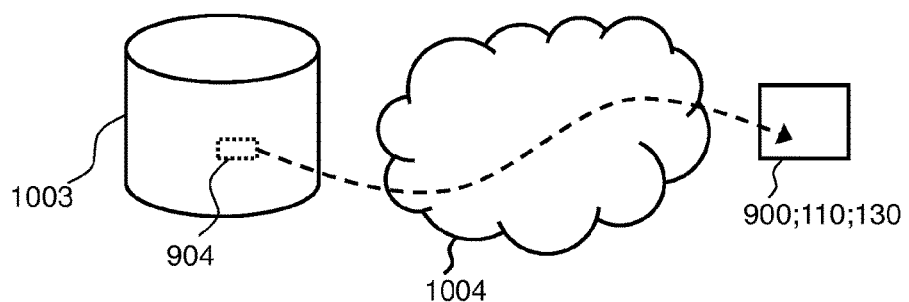

FIGS. 10a-c are schematic drawings illustrating embodiments relating to a computer program that may be the computer program 903, and that comprises instructions that when executed by the processing circuit 904 and/or processing module 901 causes the core network node 107 or the first network node 109 to perform the respective method as described above.

In some embodiments there is provided a computer program product, i.e. a data carrier, comprising a computer-readable medium and the computer program 804 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 1001 as in FIG. 10a, a disc storage medium 1002 such as a CD or DVD as in FIG. 10b, a mass storage device 1003 as in FIG. 10c. The mass storage device 1003 is typically based on hard drive(s) or Solid State Drive(s) (SSD). The mass storage device 1003 may be such that is used for storing data accessible over a computer network 1005, e.g. the Internet or a Local Area Network (LAN).

The computer program 904 may furthermore be provided as a pure computer program or comprised in a file or files. The file or files may be stored on the computer-readable medium and e.g. available through download e.g. over the computer network 1005, such as from the mass storage device 1003 via a server. The server may e.g. be a web or file transfer protocol (ftp) server. The file or files may e.g. be executable files for direct or indirect download to and execution on the node 900, e.g. by the processing circuit 904 or may be for intermediate download and compilation to make them executable before further download and execution causing the node to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the core network node 107 and/or the first network node 109 to be configured to and/or to perform the above-described methods, respectively.

The term "network node" as used herein may as such refer to any type of radio network node (described below) or any network node, which may communicate with at least a radio network node. Examples of such network nodes include any radio network node stated above, a core network node (e.g. MSC, MME, etc.), Operations & Maintenance (O&M), Operations Support Systems (OSS), Self Organizing Network (SON) node, positioning node (e.g. E-SMLC), MDT etc.

The term "radio network node" as used herein may as such refer to any type of network node serving a wireless device, e.g. UE, and/or that are connected to other network node(s) or network element(s) or any radio node from which a wireless device receives signals. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Each of the terms "wireless device", "user equipment" and "UE", as used herein, may as such refer to any type of wireless device arranged to communicate with a radio network node in a cellular or mobile communication system and may thus be referred to as a wireless communication device. Examples include: target devices, device to device UE, device for MTC, machine type UE or UE capable of machine to machine (M2M) communication, PDA, iPAD, Tablet, mobile terminals, smart phone, laptop embedded equipped (LEE), laptop mounted equipment (LME), USB dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may be used for the sake of simplicity, in order to denote a node which may be a network node, a radio network node or a wireless device, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a wireless communication system, for managing operation of multiple Radio Access Technologies, "RATs", a first type of wireless devices being enabled to communicate wirelessly in the wireless communication system according to a first RAT, via one or more base stations, wherein, in the first RAT, resource blocks for uplink and/or downlink communication are allocated according to a predetermined multiple access structure based on frequency division and/or time division, wherein the method comprises:

excluding for allocation to the first type of wireless devices one or more of said resource blocks of the first RAT; and allocating said excluded one or more resource blocks of the first RAT for use by a second type of wireless devices and for wireless communication according to a second RAT, via said one or more base stations, wherein the one or more resource blocks of the first RAT are multiple resource blocks that are continuous in at least one of frequency or time, thereby forming a continuous block, wherein the second RAT uses sub-blocks of the continuous block as resource blocks of the second RAT and uses at least one of a frequency division factor or a time division factor that is different than that used by the first RAT, thereby enabling the second RAT to define a resource block of the second RAT in relation to dimensions of a resource block of the first RAT;

wherein the first RAT is GSM, wherein said second RAT is a RAT having more carriers, but of more narrow bandwidth, than in GSM.

2. The method as claimed in claim 1, wherein the method is performed by a node comprised on the wireless communication system.

3. The method as claimed in claim 1, wherein the wireless communication of the second type of wireless devices is according to the second RAT in the uplink and according to the first RAT in the downlink.

4. The method as claimed in claim 1, wherein the second RAT defines its own resource blocks within the time and/or frequency space corresponding to the excluded one or more resource blocks of the first RAT.

5. The method as claimed in claim 1, wherein said continuous block is continuous in time and/or frequency over a whole channel of the first RAT.

6. The method as claimed in claim 1, wherein one or more control channels of the first RAT are shared with the second RAT.

7. The method as claimed in claim 1, wherein the second RAT uses an even multiple of a symbol rate of the first RAT.

8. The method as claimed in claim 1, wherein said exclusion is accomplished by using Uplink State Flag, "USF", values assigned to the second type of wireless devices for communication according to the second RAT.

9. A non-transitory data carrier comprising a computer program product comprising a non-transitory computer readable medium, wherein the non-transitory computer readable medium has stored there on a computer program comprising instructions that when executed by a processing circuit cause a network node comprised on the wireless communication system to perform the method according to claim 1.

10. A node, comprised in a wireless communication system, for managing operation of multiple Radio Access Technologies, "RATs", a first type of wireless devices being enabled to communicate wirelessly in the wireless communication system according to a first RAT; via one or more base stations, wherein, in the first RAT, resource blocks for uplink and/or downlink communication are allocated according to a predetermined multiple access structure based on frequency division and/or time division, wherein the node comprises:

a processing circuit; an I/O module coupled to the processing circuit; and a memory coupled to the processing circuit and configured to provide communications in the wireless communication system;

wherein the processing circuit is configured to: exclude for allocation to the first type of wireless devices one or more of said resource blocks of the first RAT, and allocate said excluded one or more resource blocks of the first RAT for use by a second type of wireless devices and for wireless communication according to a second RAT, via said one or more base stations, wherein the one or more resource blocks of the first RAT are multiple resource blocks that are continuous in at least one of frequency or time, thereby forming a continuous block, wherein the second RAT uses sub-blocks of the continuous block as resource blocks of the second RAT and uses at least one of a frequency division factor or time division factor that is different than that used by first RAT, thereby enabling the second RAT to define a resource block of the second RAT in relation to dimensions of a resource block of the first RAT;

wherein the first RAT is GSM, wherein said second RAT is a RAT having more carriers, but of more narrow bandwidth, than in GSM.

11. The node as claimed in claim 10, wherein the wireless communication of the second type of wireless devices is according to the second RAT in the uplink and according to the first RAT in the downlink.

12. The node as claimed in claim 10, wherein the second RAT define defines its own resource blocks within the time and/or frequency space corresponding to the excluded one or more resource blocks of the first RAT.

13. The node as claimed in claim 10, wherein said continuous block is continuous in time and/or frequency over a whole channel of the first RAT.

14. The node as claimed in claim 10, wherein one or more control channels of the first RAT are shared with the second RAT.

15. The node as claimed in claim 10, wherein the second RAT uses an even multiple of a symbol rate of the first RAT.

16. The node as claimed in claim 10, wherein said exclusion is accomplished by using Uplink State Flag, "USF", values assigned to the second type of wireless devices for communication according to the second RAT.

* * * * *